(12) United States Patent
Giesen et al.

(10) Patent No.: US 10,896,283 B1
(45) Date of Patent: Jan. 19, 2021

(54) NOISE-BASED OPTIMIZATION FOR INTEGRATED CIRCUIT DESIGN

(71) Applicant: International Business Machines Corporation, Armonk, NY (US)

(72) Inventors: Kyle Indukummar Giesen, Poughkeepsie, NY (US); Samuel Sagan, Beacon, NY (US); David Wolpert, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/543,070

(22) Filed: Aug. 16, 2019

(51) Int. Cl.
*G06F 17/50* (2006.01)
*G06F 30/398* (2020.01)
*G06F 30/20* (2020.01)
*G06F 30/394* (2020.01)
*G06F 30/3308* (2020.01)

(52) U.S. Cl.
CPC ............ *G06F 30/398* (2020.01); *G06F 30/20* (2020.01); *G06F 30/394* (2020.01); *G06F 30/3308* (2020.01)

(58) Field of Classification Search
CPC ...... G06F 30/398; G06F 30/20; G06F 30/394; G06F 30/3308
USPC .............................. 716/115, 106, 136; 703/15
See application file for complete search history.

(56) References Cited

U.S. PATENT DOCUMENTS

| | | | | |
|---|---|---|---|---|
| 7,062,737 B2* | 6/2006 | Tetelbaum | ............... | G06F 30/39 716/113 |
| 7,325,218 B2* | 1/2008 | Katagiri | ................ | G06F 30/394 716/115 |
| 7,788,620 B1* | 8/2010 | Xue | ........................ | G06F 30/392 716/113 |
| 8,949,760 B2 | 2/2015 | Birch et al. | | |
| 9,342,649 B2 | 5/2016 | Morishita et al. | | |
| 2004/0044979 A1* | 3/2004 | Aji | ........................ | G06F 30/394 716/113 |
| 2007/0122719 A1* | 5/2007 | Van Den Broeke | ...... | G03F 1/36 430/5 |
| 2007/0256046 A1* | 11/2007 | Pikus | ..................... | G06F 30/39 716/54 |
| 2011/0029937 A1* | 2/2011 | Kodera | ............... | G03F 7/70441 716/52 |
| 2011/0294239 A1* | 12/2011 | Kodama | ................... | G03F 1/36 438/16 |
| 2016/0157355 A1 | 6/2016 | Paoletti et al. | | |

(Continued)

FOREIGN PATENT DOCUMENTS

WO 2013140471 A1 9/2013

OTHER PUBLICATIONS

Meysam Akbari et al., Systematic design of analog integrated circuits using ant colony algorithm based on noise optimization, Article in Analog Integrated Circuits and Signal Processing, Feb. 2016.

*Primary Examiner* — Phallaka Kik

(57) ABSTRACT

An example operation may include one or more of generating a noise map which comprises one or more noise shapes for one or more electrical components on a substrate of a circuit, modifying a design of the one or more electrical components in a pre-production design of the circuit based on the noise map and one or more noise rules of the circuit, and outputting an updated design of the circuit which includes the modified design of the one or more electrical components.

20 Claims, 9 Drawing Sheets

(56) References Cited

U.S. PATENT DOCUMENTS

2017/0140090 A1* 5/2017 Kurtz .................... G06F 30/367
2017/0161418 A1 6/2017 Park et al.

* cited by examiner

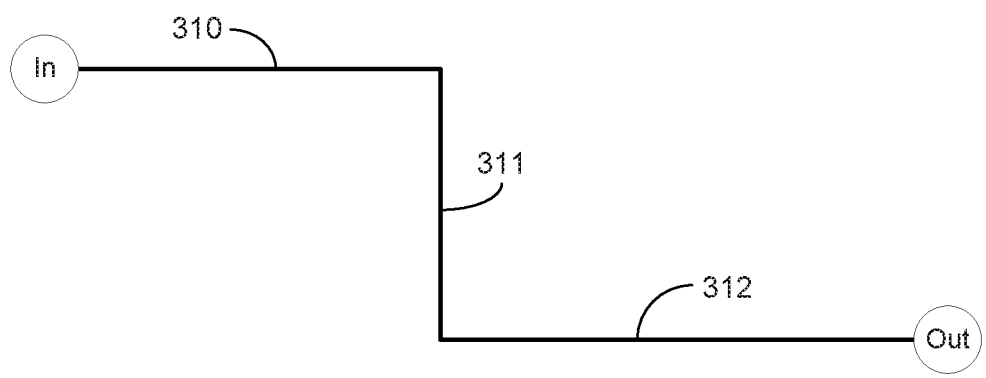
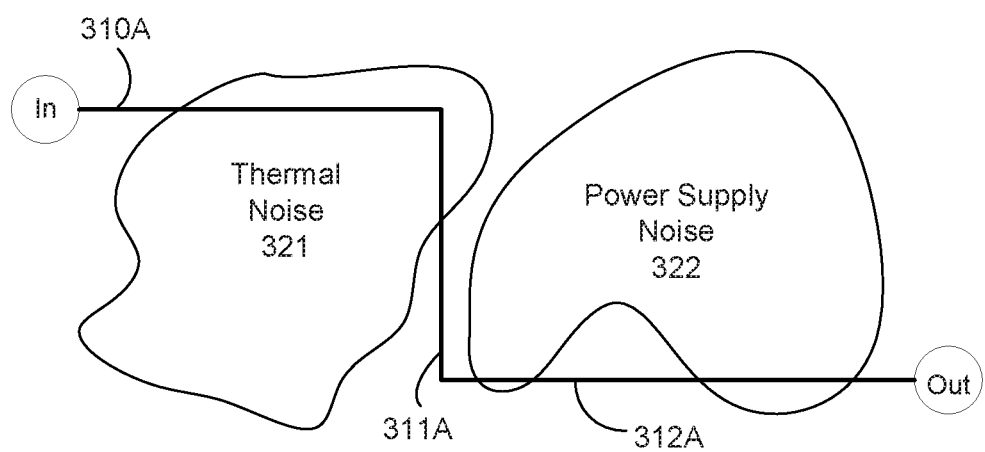

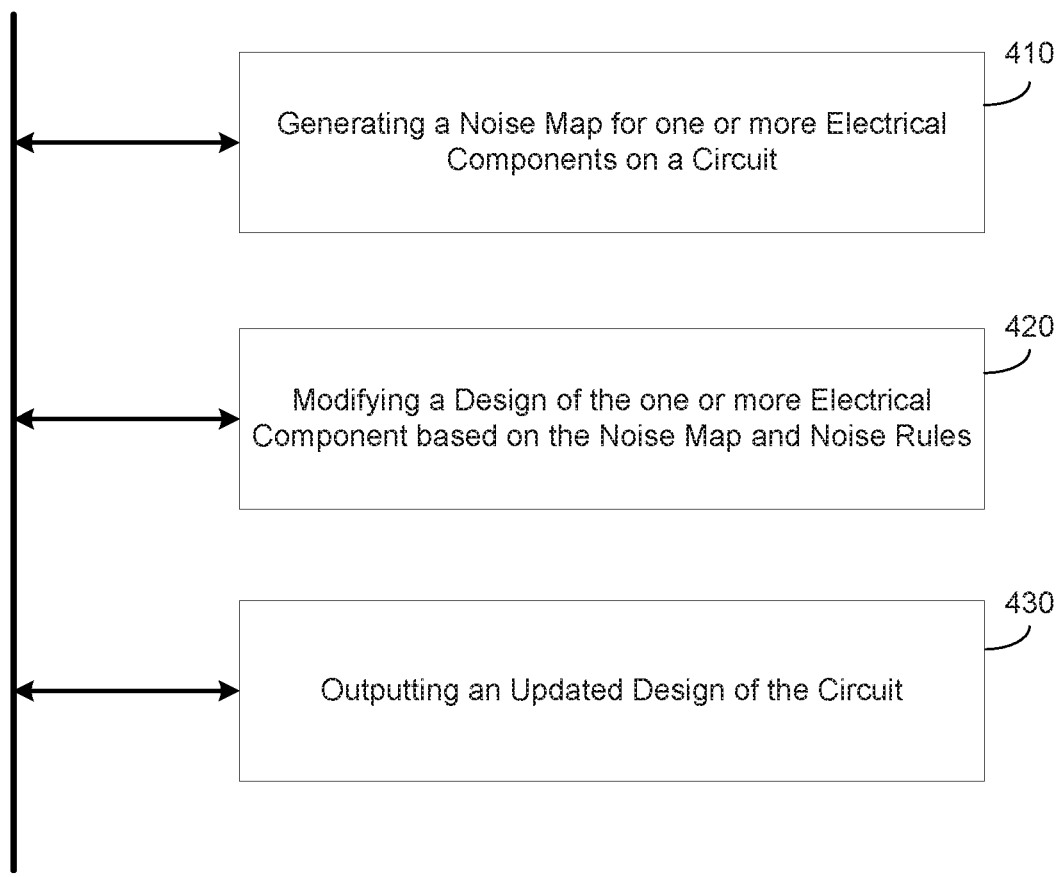

500

NOISE-BASED OPTIMIZATION FOR INTEGRATED CIRCUIT DESIGN

TECHNICAL FIELD

This application generally relates to integrated circuits, and more particularly, to noise-based optimization for integrated circuit design.

BACKGROUND

Noise is an unwanted disturbance within an electrical signal. Within the field of integrated circuits, noise is one of the most important factors in determining performance of a function of a circuit. Noise can cause various kinds of problems including missing timing closures, glitched bits, clock jitter, increased bit error rate (in I/O circuits), wasted power due to guard banding, and the like. There are many causes of noise including thermal noise, capacitive crosstalk, power supply noise, and the like. The propagation of noise is heavily dependent on a layout of the circuit and thus noise can be reduced with proper circuit design.

A circuit can include numerous individual electronic components such as resistors, transistors, capacitors, inductors, diodes, and the like, which may be connected by conductive wiring or traces through which current can flow. Identifying noise issues that are inherent within a circuit under design (e.g., during a pre-production stage) can be difficult given that electrical components can interact differently based on location, sizes, shapes, distances apart, and the like. Furthermore, fixing such issues is a costly and multivariate process that involves many tools, designers, layers of layout, and the like. Accordingly, what is needed is a solution for improving a design of a circuit prior to production.

SUMMARY

One example embodiment provides a system that includes a memory and a processor communicably coupled to one another, wherein the processor is configured to perform one or more of generate a noise map which comprises one or more noise shapes for one or more electrical components on a substrate of a circuit, modify a design of the one or more electrical components in a pre-production design of the circuit based on the noise map and one or more noise rules of the circuit, and output an updated design of the circuit which includes the modified design of the one or more electrical components.

Another example embodiment provides a method that includes one or more of generating a noise map which comprises one or more noise shapes for one or more electrical components on a substrate of a circuit, modifying a design of the one or more electrical components in a pre-production design of the circuit based on the noise map and one or more noise rules of the circuit, and outputting an updated design of the circuit which includes the modified design of the one or more electrical components.

A further example embodiment provides a non-transitory computer readable medium comprising instructions, that when read by a processor, cause the processor to perform one or more of generating a noise map which comprises one or more noise shapes for one or more electrical components on a substrate of a circuit, modifying a design of the one or more electrical components in a pre-production design of the circuit based on the noise map and one or more noise rules of the circuit, and outputting an updated design of the circuit which includes the modified design of the one or more electrical components.

BRIEF DESCRIPTION OF THE DRAWINGS

FIGS. 3A-3D are diagrams illustrating a process of generating a noise map according to example embodiments.

FIG. 4 is a diagram illustrating a method of optimizing a circuit design based on noise characteristics according to example embodiments.

DETAILED DESCRIPTION

Figure 1:
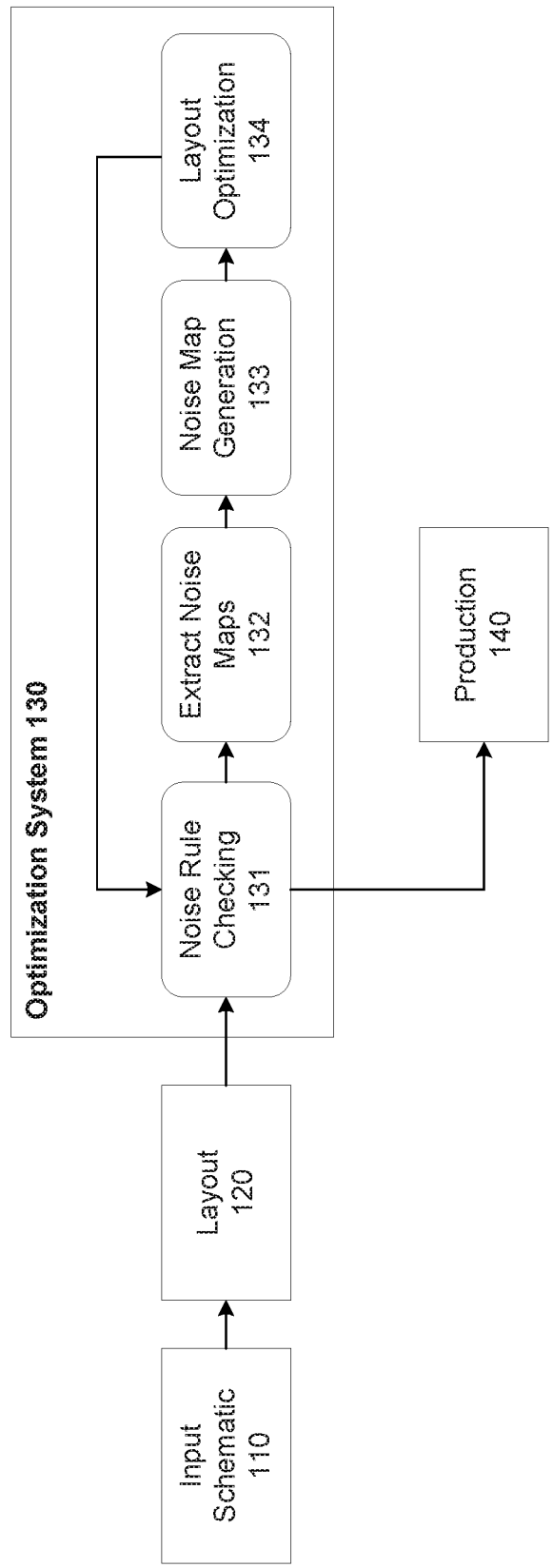
FIG. 1 is a diagram illustrating a process which includes an iterative optimization operation according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

An integrated circuit (IC) is a chip that can have various functions including an amplifier, an oscillator, a timer, a microprocessor, a computer memory, or the like. The circuit typically includes a substrate or wafer that is made of a material such as silicon. The chip can hold many electrical components (e.g., hundreds to millions) including transistors, resistors, capacitors, wire segments, and the like. These small components are capable of performing digital or analog technologies. ICs often use logic gates which work with values of ones and zeroes where a low signal sent to a component on the IC will create a value of zero and a high signal sent to the component will create a value of one.

The example embodiments are directed to an optimization process or system that can detect a non-optimal design of an IC based on simulated noise characteristics of the electrical components included within the design. The system can retrieve noise rules for the circuit including rules for each component. As a non-limiting example, the noise rules may include predefined rules for different types of noise such as thermal noise, capacitive crosstalk (when two wires are switching in the same voltage direction or opposite voltage directions, they affect each other differently), power supply noise (depending on how many circuits on a power supply rail are switching at a given point in time, the voltage on that rail will fluctuate as it is only able to support a limited amount of current), and they may be based on timing skew, timing slew, function, and the like.

The system may then process the noise rules to detect whether a design includes a layout which violates the noise rules. For example, the system may determine whether the design of the circuit creates a simulated noise that violates or otherwise fails to satisfy any of the noise rules. In response to the checking of the noise rules identifying one or more noise rule violations, the system may generate a noise map which includes simulated noise characteristics of the electrical components based on their location, size, shape, and the other electrical components on the circuit. Furthermore, the system may iteratively update the design of the circuit by moving one or more components, changing a size, shape, material, etc., within a modified schematic until the desired noise rules are satisfied. The system may output the updated design of the circuit for use in producing the circuit.

According to various embodiments, the optimization system can evaluate and optimize the design of the circuit prior to production. For example, the system may receive a model such as a two-dimensional (2D) or a three-dimensional (3D) model of the circuit including geometry, material information, size information, and the like. Based on this information, the system can check whether the design violates any predefined noise rules. When such violation occurs, the system can generate individual noise maps for a plurality of components on the circuit. For example, the system may generate noise maps for all components or for a portion of the components. Furthermore, the system may generate a noise map, such as a comprehensive noise map, that includes total noise impact on each component based on the noise created by the respective component and the surrounding components. The system can use this information to iteratively achieve a more optimal design which includes, for example, a least amount of noise or a noise amount below a certain threshold. The resulting modified design can be output for production of the circuit.

FIG. 1 illustrates a process 100 which includes an iterative optimization loop which may be performed by an optimization system 130, according to example embodiments. Referring to FIG. 1, the process 100 may be a pre-production process which is used to identify regions of an integrated circuit layout in need of optimization based on a simulated multisource noise map. The process 100 may be performed on a system such as a server, a database, a user device, a cloud platform, a combination of devices, and the like. In this example, the process 100 is at least partially performed by the optimization system 130 which may be executed by a computing system. It should also be appreciated that all of the steps of the process 100 may be performed by the optimization system 130 in some embodiments, and that some of the steps may be omitted and/or combined in other embodiments.

In the example of FIG. 1, in step 110, the process may include receiving an input which includes a schematic of an integrated circuit design. For example, the input schematic may include a model of an integrated circuit to be designed including structural attributes and material properties of electric components that are to be embedded, integrated, attached, or otherwise included on an integrated circuit. In step 120, a layout of the integrated circuit may be identified from the schematic that is input in 110. The layout may include a representation of a substrate and the electric components. Here, the layout may include a 2D/3D model of the circuit that is being designed including geometric shapes representing structures of the electric components as well as the substrate. The layout may also include properties of the electric components such as sizes, materials, workloads, functions, and the like.

The layout 120 may be input to the optimization system 130 which performs an iterative optimization loop that includes noise rule checking in step 131, noise map extraction in step 132, noise map generation in step 133, and layout optimization in step 134. Here, the loop may be repeated a number of times to further improve/optimize the layout of the circuit design until the noise rules are satisfied. During the noise rule checking in step 131, the optimization system 130 may identify predefined noise rules, which may be binary thresholds, which may be provided by a designer of the IC, by default, by an application, or the like. The rules may identify thresholds for different types of noise such as thermal noise, power supply noise, capacitive crosstalk and the like. The rules may be stored alongside the electrical components such as logic gates and wire segments within the layout data. Here, the optimization system 130 may check or determine to see whether any of the noise rules are violated by the initial layout 120 of the circuit design.

The layout 120 may include models that are provided by a foundry for the designer, which may be used to identify noise maps for the electronic components of the substrate. For checking the path timing/functionality, the optimization system 130 may use timing tools that are used in a design flow, where each library cell is given input pin and output pin timing information. In this example, wires are extracted for resistances and capacitances, and some routines are run to turn the combination of those elements into a timing report (e.g., does a signal get from a source clocked element to a sink clocked element within the desired cycle time).

The noise rules that are identified in step 131 may include binary thresholds which are a designer's requirements for each type of noise to ensure that their design functions as desired. For example, the noise rules may include a model of thermal noise that posits if the temperature deviates more than 20° C. beyond what the timing tool is assuming, the path will no longer meet its respective timing requirement. In this example, the designer may set the binary threshold to 15° C. or some appropriate level of conservatism to ensure that the net will be shifted into an appropriate noise region to guarantee that it meets the timing requirements.

In step 132, in response to determining that one or more noise rules identified in step 131 are violated or otherwise not satisfied by the initial layout, the optimization system 130 may extract or otherwise generate individual noise maps for a plurality of electrical components on the circuit. The noise maps may include individual simulated noise shapes of each electrical component of the integrated circuit or each of the electrical components within a portion of the integrated circuit.

In step 133, the optimization system 130 may combine the plurality of noise maps generated in step 132 to create a comprehensive noise map representing the total impact of noise from all of the components. Here, each electrical component may include a vector with a total noise value and shape of noise on the respective component based on the noise created by the component and noise from other components on the circuit.

The noise rules may be based on models provided by the foundry, and the models may take into account the materials used, wire dimensions, device types, etc. An example of a cross-talk noise rule would indicate that a maximum capacitance between a victim line being tested and all aggressor lines nearby must be no more than x femtofarads (fF). An example of a power supply noise rule would indicate that the maximum voltage bounce on a power rail feeding a device must be no more than y millivolts (mV). An example of a thermal noise rule would indicate that the maximum temperature swing above ambient for a given device must be no more than z degrees Celsius (° C.). Each of these units may have different values, which shows the value of having a 'unitless' vector to inform the layout optimization, for example, "to avoid cross-talk, power supply, and thermal noises, move this wire here" versus the alternative that is traditionally performed, where a designer will run a thermal analysis and try to correct related issues, then run a cross-talk analysis and try to correct any of those issues, and then run a power analysis and try to correct those, etc. All of these actions are performed independently and unable to achieve an optimal point compared to when combined into a noise map. The results of the independent analyses might conflict with each other, resulting in a non-converging optimization routine. To avoid such a scenario, the instant solution provides the noise map created in step 133.

Noise rules are driven by a designer's design requirements for a given net (each net may have a different noise rule). The need to limit noise is known; however, the example embodiments provide a novel approach for combining a variety of different noise components into a comprehensive noise map, and the noise rules provide a unitless way of converting that map into a set of actionable changes in device and wire placement. While a 'component noise rule' might be a design approach to meet high and low temperature corners, the noise rules are advantageously derived through the creation of the instant comprehensive noise map.

In step 134, the optimization system 130 may optimize the layout provided by modifying one or more electrical component designs. For example, the optimization system 130 may move an electrical component on the substrate by a distance such that it is farther apart, closer to, or the like, from one or more other components on the substrate. As another example, the optimization system 130 may change a shape, a size, a material, or the like, of a component to improve the overall noise on the integrated circuit. The optimization may then repeat step 131 to determine whether the optimized design satisfies the noise rules of the circuit. If one or more noise rules are still not satisfied, the optimization system 130 may repeat steps 131-134. When all noise rules have been satisfied or some other condition has been met, for example, a predetermined number of iterations, a predetermined time limit, etc., the optimized circuit design may be passed to a production system 140, or to another system such as a user device, a computer, etc.

Figure 2A:
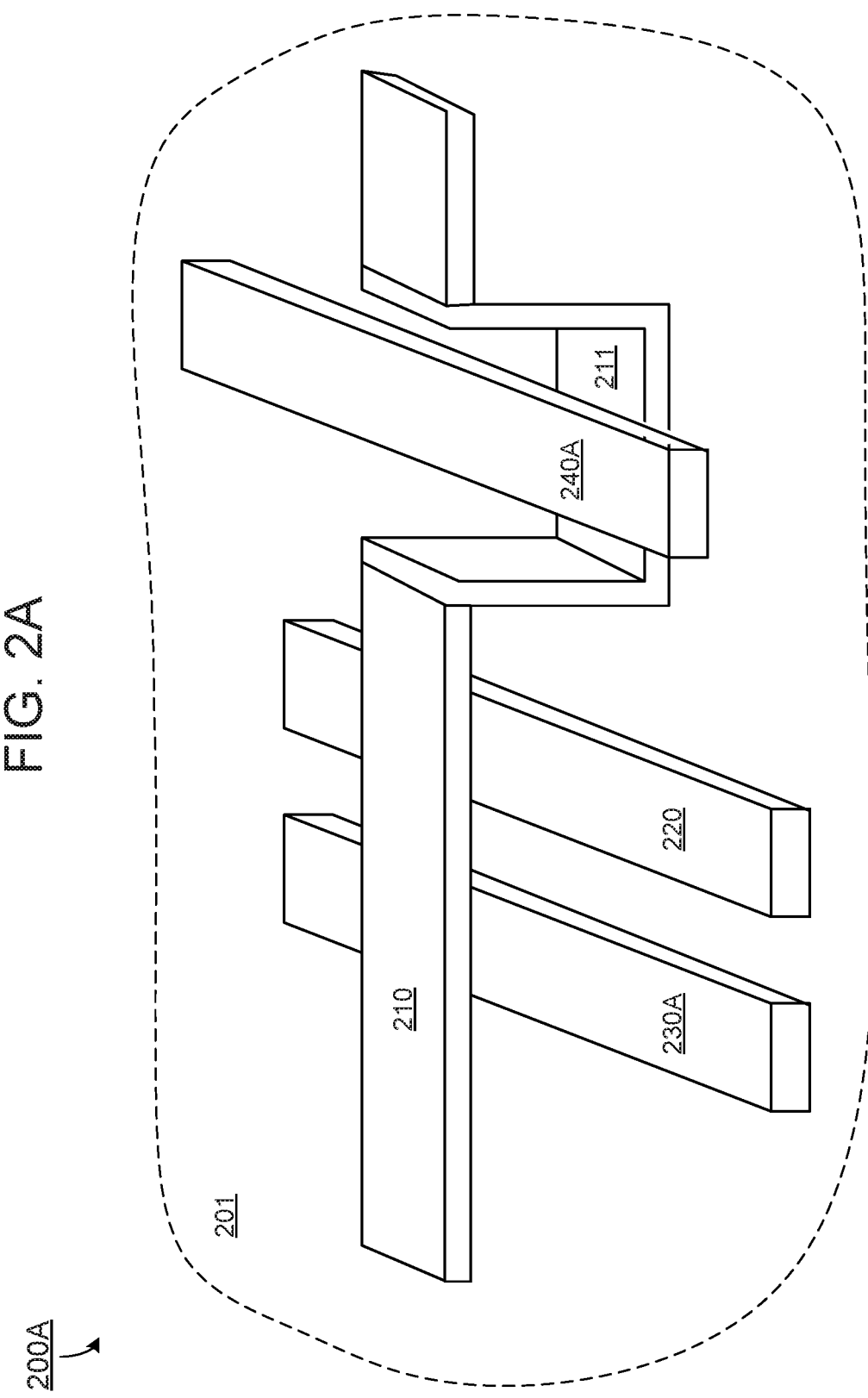
FIGS. 2A-2D are diagrams illustrating a circuit design including electrical components on a substrate according to example embodiments.

FIGS. 2A-2D illustrate a schematic of a circuit design which includes electrical components disposed on a substrate according to example embodiments. Referring to FIG. 2A, an initial circuit design 200A is shown which includes a three-dimensional model of a portion of a substrate 201 including a plurality of electrical components 210, 211, 220, 230A, 240A, and the like. The electrical components may include wires, resistors, transistors, capacitors, etc. Here, the initial circuit design is yet to be optimized. The initial circuit design 200A may be the schematic layout which is uploaded to the optimization system 130 shown in FIG. 1.

In response to receiving the initial circuit design 200A, the optimization system may identify noise rules that are associated with the plurality of electrical components 210, 211, 220, 230A, and 240A. When the optimization system determines that a noise rule is violated, the optimization system may generate noise maps from the initial circuit design. The noise maps may include simulated noise patterns that are determined based on the materials, shapes, sizes, etc., of the individual electrical components 210, 211, 220, 230A, and 240A. Referring to the example layout 200B shown in FIG. 2B, the optimization system identifies crosstalk noise 250 between the electrical components 220 and 230A. The crosstalk 250 may be an undesired noise effect that is created by undesired capacitive, inductive, conductive coupling, or the like, between the component 220 and the component 230A. Although not shown in FIG. 2B, the noise map (shown in FIG. 3B) may identify a shape and a pattern of the noise as well as the component(s) involved.

Figure 2B:
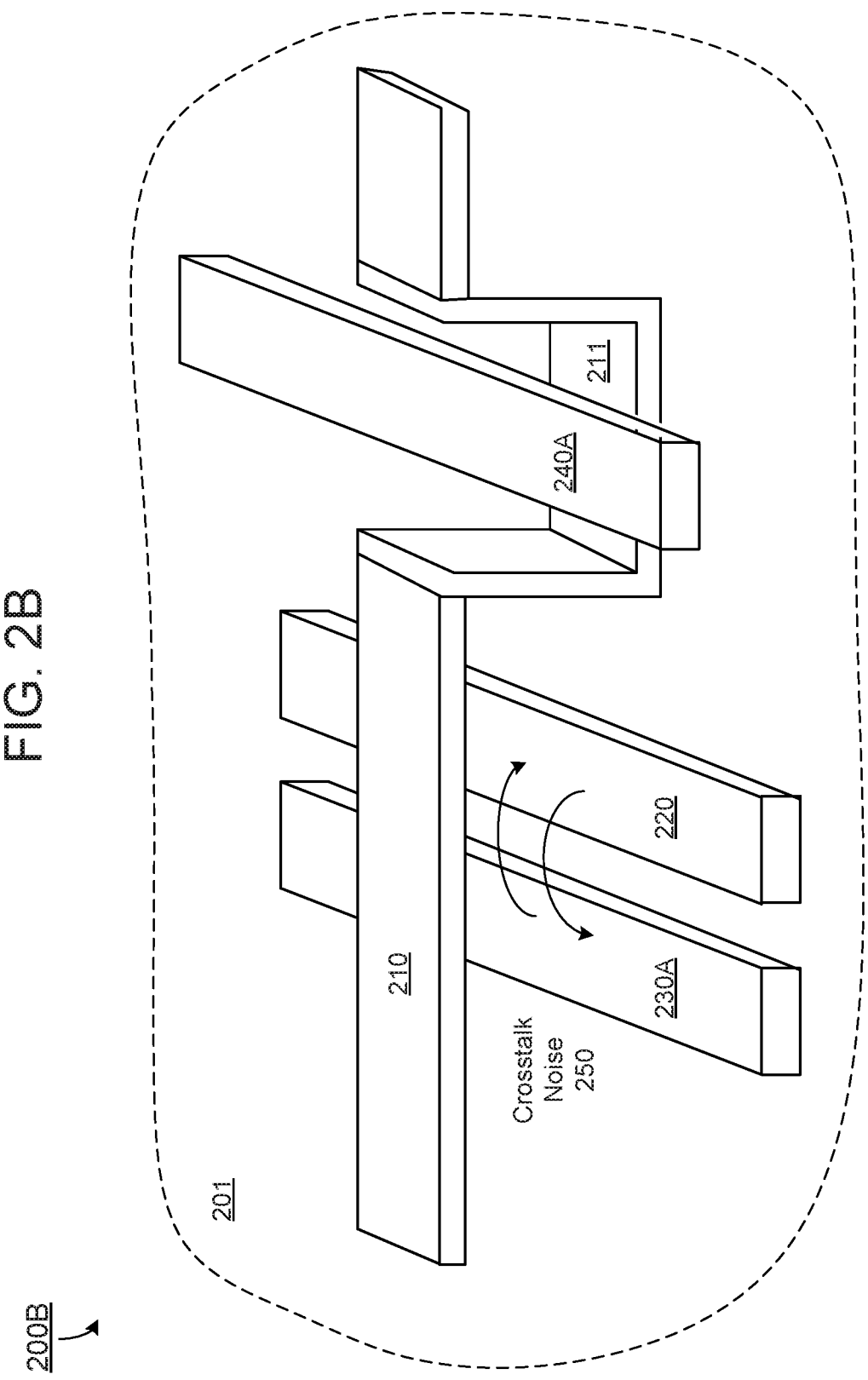
Figure 2C:
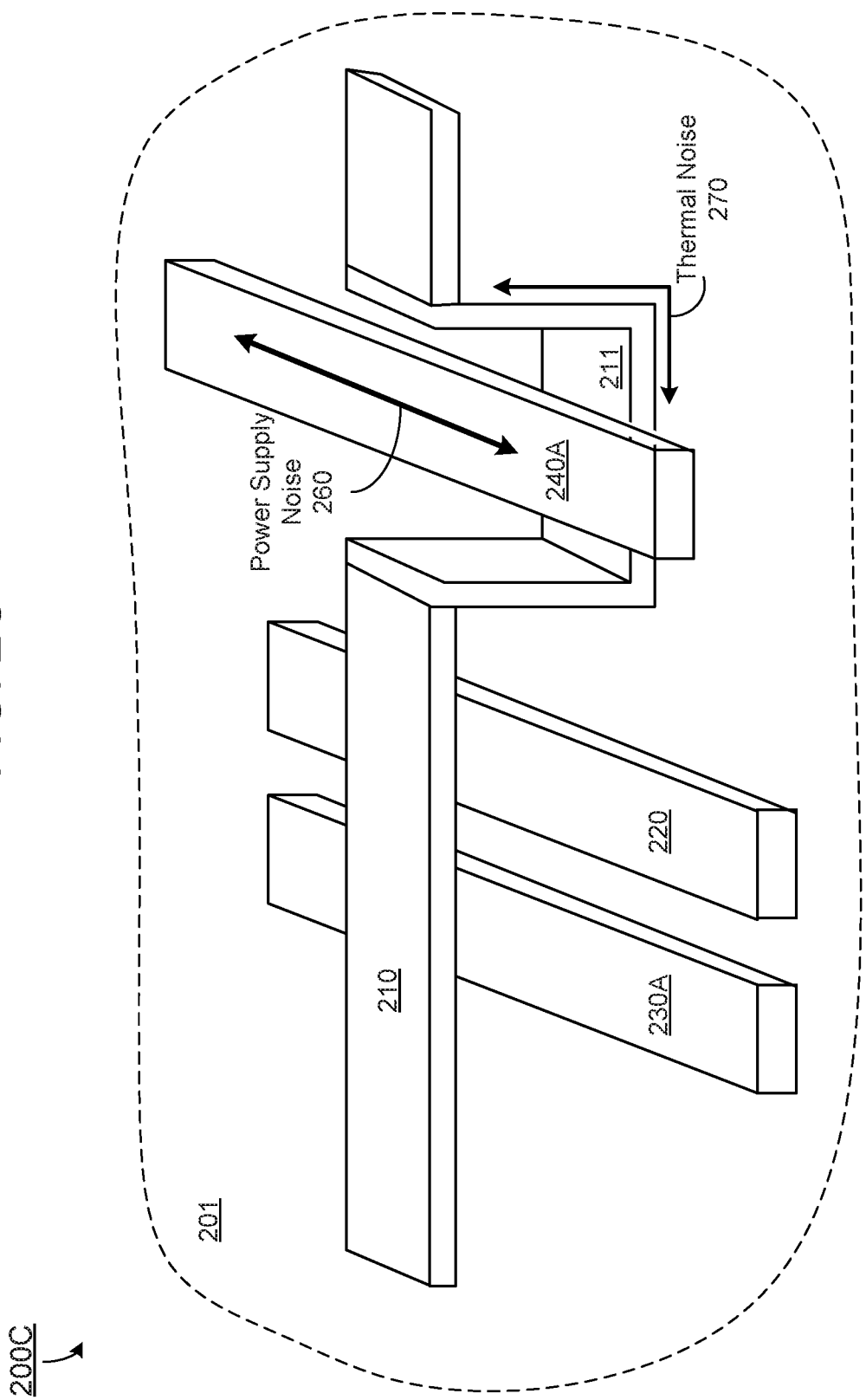

Referring to the layout 200C shown in FIG. 2C, the optimization system identifies a power supply noise 260, that may be a simulated power supply noise, that is influencing the component 240A and a thermal noise 270, that may be a simulated thermal noise, that is influencing the component 211. The power supply noise 260 may be generated by a difference between local voltage references of a driver and a receiver. The increased amount of current on power supply lines causes increased voltage droop on voltage references which makes the gate have higher sensitivity to noise spikes. The thermal noise 270 may be created by thermal fluctuations of charge carriers inside a conductive medium.

Figure 2D:
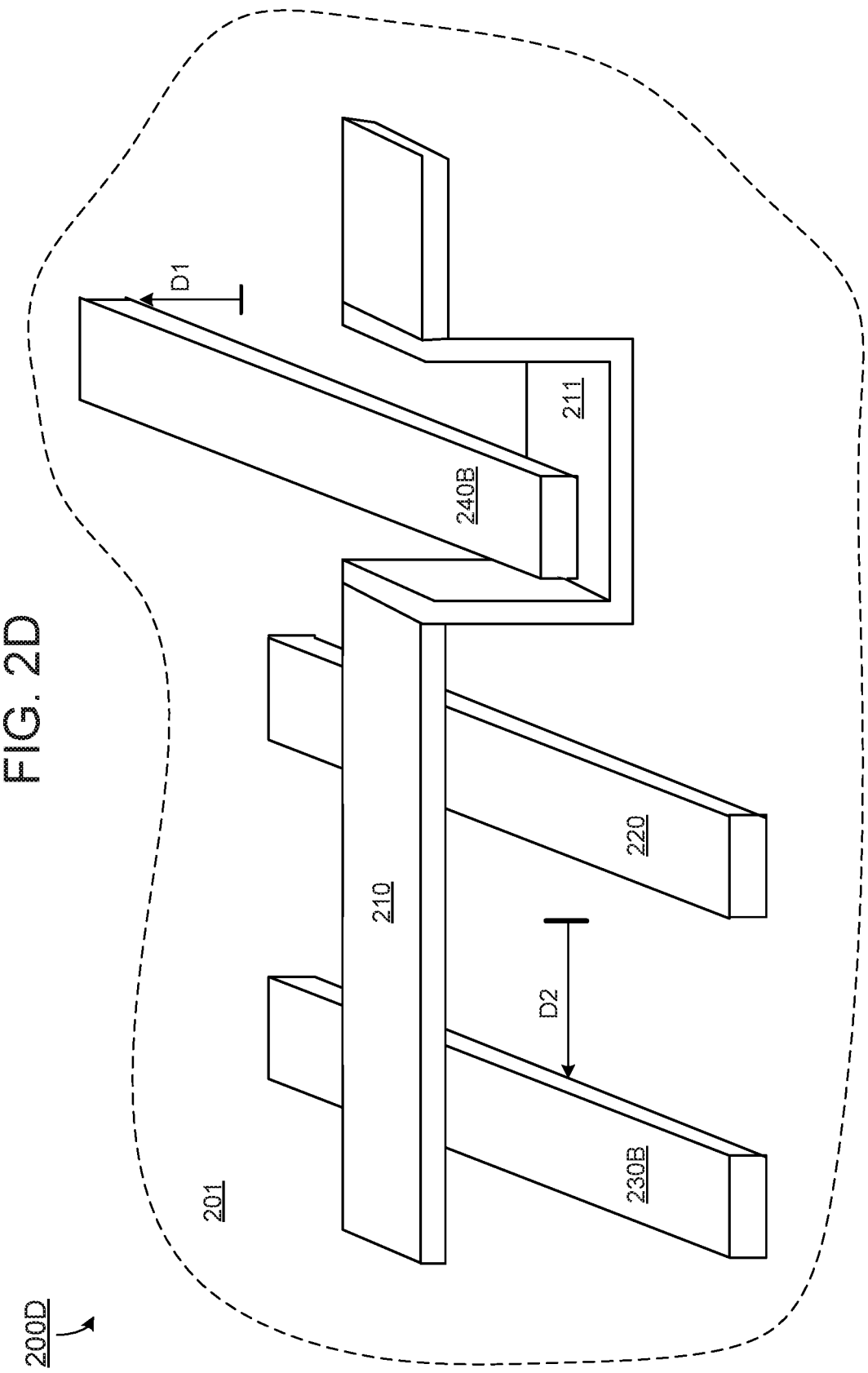

FIG. 2D illustrates an example of an optimized layout 200D in which the optimization system has moved electrical component 230A (to 230B) and electrical component 240A (to 240B), based on the noise maps identified in FIGS. 2B and 2C. In this example, the optimization system has moved electrical component 230B a distance D2 away from electrical component 220 to reduce the crosstalk noise. Likewise, the optimization system has moved electrical component 240B a distance D1 above electrical component 211 to reduce the effect of the power supply noise created by the electrical component 240B and the thermal noise created by the electrical component 211.

The optimized layout 200D may be automated by the optimization loop and it may be repeated until all noise rules are satisfied or until some other condition occurs. For example, components marked as having failed their noise rule check may be moved in a direction and a distance that corresponds to an average of all their adjacent comprehensive noise 3D cell vectors. Components may only be moved to the extent allowable so that they do not create spatial conflicts with other components and their respective keep out regions. Accordingly, the optimization system may reduce complexity and manual design resources required, reduce design time, and further reduce design iterations by allowing informed layout fixes to solve several noise problems at once.

Figure 3C:
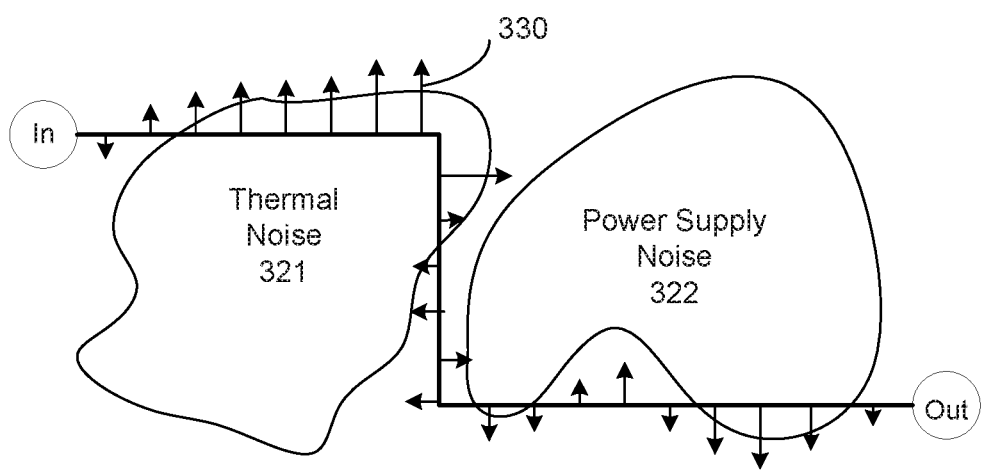

FIGS. 3A-3D illustrate a process of generating a comprehensive noise map according to example embodiments. Referring to FIG. 3A, a schematic 300A depicts electrical components 310, 311, and 312 and an input and an output.

Here, the electrical components 310, 311, and 312 may be a subset of many electrical components on a substrate; however, for purposes of simplicity, only the electrical components 310, 311, and 312 are shown. In this example, the electrical components 310, 311, and 312 may fail their noise rule checks. For example, one or more binary thresholds for noise set forth by predetermined noise rules may be violated based on the layout of the electrical components shown in the schematic 300A.

The noise rule checking is reacting to the output of a series of point tools that are run during the physical design process. The noise rule checking is a set of binary thresholds that examine each net in a design and identify if that net is experiencing a given amount of timing skew, timing slew, or functional challenge because of the noise environment that it is currently placed in. In one embodiment, these rules are stored alongside a list of logic gates and wire segments composing each of the nets being examined. Each of the thresholds is set manually based on modeled timing/functional problems to provide an exit criteria for the optimization loop that may be used to iteratively improve the placement and routing solution based on the noise thresholds. The noise rules are dependent on items such as materials and wire or gate dimensions, which are just a few of the larger set of criteria that a designer would use to set those binary thresholds.

Referring to FIG. 3B, a schematic 300B depicts electrical components 310A, 311A, and 312A and an input and an output. FIG. 3B illustrates individual noise maps 321 and 322 which may be created by simulation of noise. The noise maps 321 and 322 may include a shape, a size, a pattern, and the like. In 3D models, the noise maps 321 and 322 may further include depth information showing an intensity of the noise. Noise tools may perform a set of parasitic extractions based on the material properties of the metal and device structures, their proximity to each other and placement patterns, and their activity (e.g., if they are actively switching between a high voltage and low voltage). The types of noise for these tools include concepts like thermal noise, capacitive crosstalk coupling, power supply noise, etc.

These tool results are individual one-off simulations. In FIG. 3C, the individual noise maps 321 and 322 are combined to create a comprehensive noise map 300C which provides a comprehensive noise profile for the electrical components 310, 311, and 312 as shown in the layout. In this example, a given extracted netlist (e.g., the set of resistances, capacitances and currents associated with the devices and metal) is combined with the structural proximity of every pair of wires to produce an overall table of "noise impact" (with a variety of units 330) associated with each piece of metal and each device comprising each net on a chip. The instant solution provides an iterative process that exploits these individual noise tool runs and updates locations of the devices and wires in response to these noise impacts.

The comprehensive noise map 300C is a combination of the individual component tool results, combined to provide an overall "total noise impact." This total noise impact has a value and a direction represented by vectors 330. The value is a combination of the individual noise impacts at a given location. The direction is created by examining how the total noise impact varies in the area around a given wire or device. For example, if there is a temperature hotspot on left side of a device, the component noise map will indicate that the device should be moved to the right. In the same area, there may be a wire (such as a clock wire) that is switching very strongly and at very high speeds, creating a large crosstalk noise. The crosstalk component noise map will indicate that the wire should be moved away from that large noise source. Thus, when the component noise maps associated with the component noise tools are combined, an output includes the total accumulated noise impact and the combined direction that is the result of all of the individual component directions. This final comprehensive map direction might be opposing one of the component maps, depending on the strengths of the other associated component maps.

Each component noise map's impact is weighted by the distance the victim net should move in order to reduce that component noise impact by a particular percentage, which may be user defined. This combination of component maps provides a distance-based weighting rather than some combination of noise units (e.g. ° C., mV, activity factor), to create a clear indicator for a placement tool to understand a 'net' suggested improvement to the metal and/or device positions.

Figure 3D:
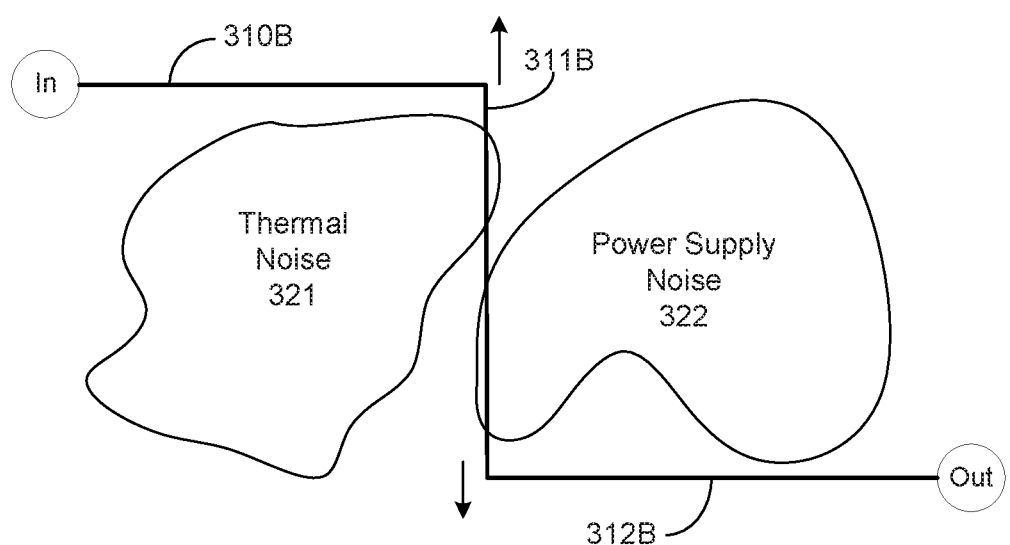

FIG. 3D illustrates an optimized layout 300D in which the electrical components are moved as represented by 310B, 311B, and 312B. The comprehensive noise map and the netlist are the inputs to the optimization process. A process or algorithm related to the movement includes a device/wire shift based on the comprehensive noise map 300C that is generated in FIG. 3C. The algorithmic loop is to generate the comprehensive noise map 300C, shift the devices/wires based on the vectors in the noise map, then check to see if the noise thresholds are resolved. If not, the instant process or system may recreate a new noise map based on the new device/wire positions, and iterate until the exit criteria (passing the noise thresholds) is met. This process may have additional constraints related to timing and functional net requirements. For example, the system may not move a wire a certain distance (such as 2 mm) if it no longer satisfies the timing requirement on the net.

The optimization performed in FIG. 3D may be repeated. Here, the loop may be performed because the individual device/wire shifts from the first comprehensive noise map results might be insufficient to meet the noise rule checking criteria. A goal is to predict in advance what the resulting comprehensive noise map may look like after the layout optimization is complete. The system may put the overall noise of the design in a better spot from one iteration to another, but it might not completely satisfy the noise rules in the first iteration as wires that are moving and causing noise in one iteration will be moving and adjusting the noise picture of future iterations, requiring further iterations.

The system described herein may also cause an integrated circuit to be fabricated based on the optimized design. For example, the system may cause a fabrication plant (e.g., a foundry, etc.) or other entity to fabricate the integrated circuit using the layout in the optimized design. In addition, the integrated circuit may be fabricated according to any known processes. For example, a wafer with multiple copies of the circuit design may be fabricated and cut (i.e., diced) where each die is one copy of the integrated circuit. In another example, a mask may be fabricated and used for lithography based on the optimized design. In a further example, the wafer may be fabricated using the masks to perform photolithography and etching.

FIG. 4 illustrates a method 400 of optimizing a circuit design based on noise characteristics according to example embodiments. Referring to FIG. 4, one or more of steps 410-430 may occur via one or more of the elements, nodes or systems that are described or depicted herein. In step 410, the method may include generating a noise map which comprises noise shapes for one or more electrical components on a substrate of a circuit. For example, the generating may include simulating a plurality of noise maps for a plurality of electrical components, and combining the plurality of simulated noise maps into the noise map (which may be a comprehensive noise map). In this case, the individual noise maps may be combined into a total noise map which provides a total impact in vector form on the respective electrical components of the integrated circuit. For example, the noise map may include a total noise value and direction for an electrical component based on noise from all of the electrical components on the circuit. In some embodiments, the noise map may include a schematic representation of a noise shape for one or more of thermal noise, capacitive cross coupling noise, and power supply noise.

In step 420, the method may include modifying a design of the one or more electrical components in a pre-production design of the circuit based on the comprehensive noise map and one or more noise rules (which may be pre-defined) of the circuit. For example, the pre-production design of the circuit may include a schematic layout of the circuit including geometric designs of the electrical components and placements of the electrical components on the substrate. The geometric designs may include location, size, distance apart from other components, shape, and the like. The design may also include a 2D model or a 3D model generated using various tools such as computer-aided design.

In this example, the modifying may include moving a location of the electrical component a distance on the substrate based on a value and a direction of noise to the electrical component in the generated comprehensive noise map. Other examples of modifying include, but are not limited to, changing a shape of the electrical component, changing a height, a size, a material, a thickness, and the like. In some embodiments, the modification may be integrated into the schematic including the geometric representation of the circuit. The noise rules for the electrical components may identify binary thresholds (e.g., set by a designer, etc.) for one or more of timing skew, timing slew, functional challenge, and the like.

In step 430, the method may include outputting an updated design of the circuit which includes the modification of the design of the one or more electrical components. For example, an updated schematic of the pre-production design may be output via a display or sent to an application, device, etc. In some embodiments, an iterative optimization may be performed. In this example, the method may determine whether the updated design of the circuit does not satisfy at least one predefined noise rule of the circuit, and in response, modifying a design of the previously modified electrical component and/or at least one other electrical component on the substrate. This process may be iteratively repeated until the design satisfies all of the predefined noise rules for the circuit design.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
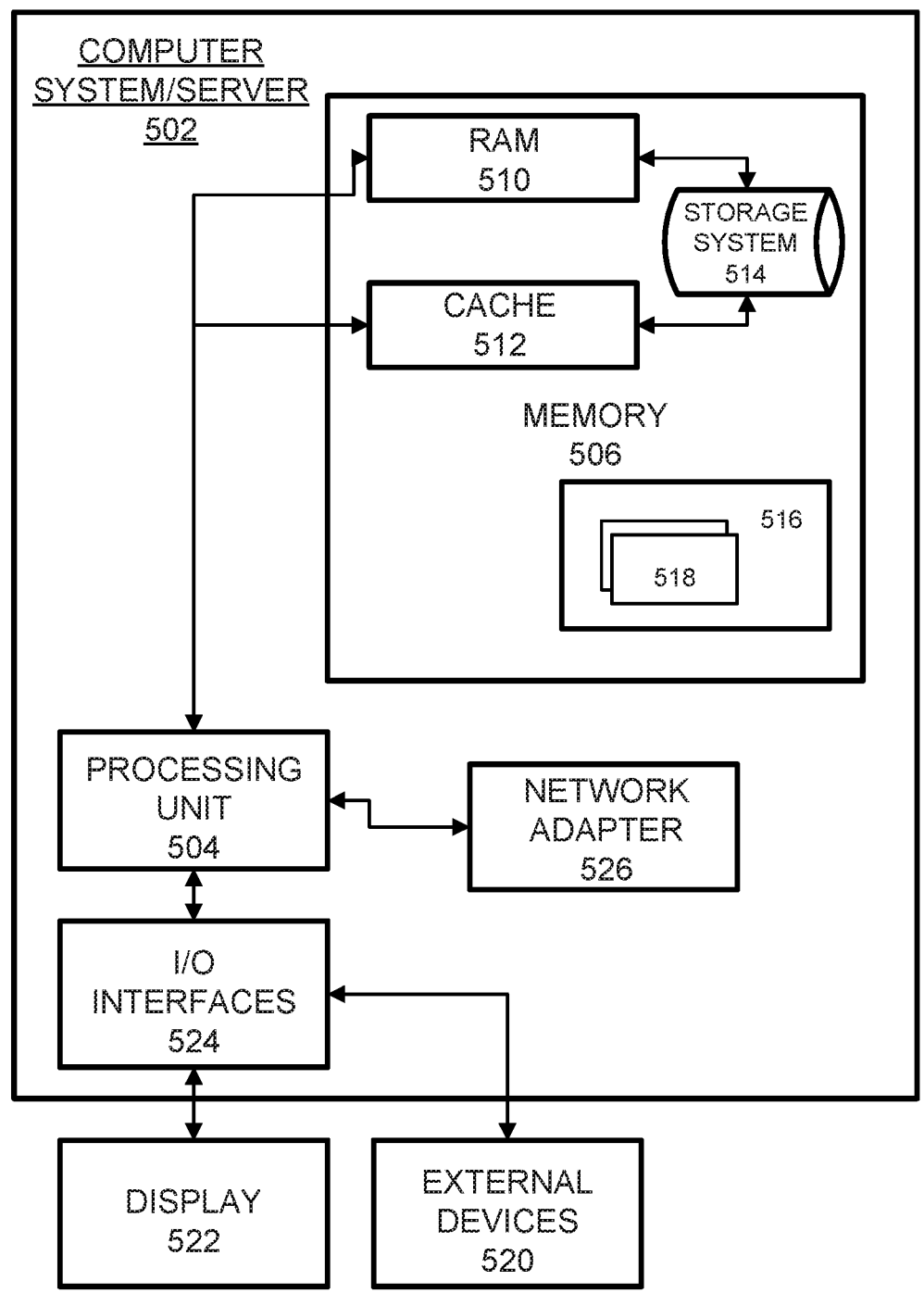
FIG. 5 is a diagram illustrating a computer system configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth herein. For example, the computing node 500 may be a network server of a larger enterprise network that connects multiple user workstations to the Internet, a private network, and the like.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units (processor) 504, a system memory 506, and a bus that couples various system components including the system memory 506 to the processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524 (which may be referred to herein as an output and/or an input). Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, and the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
   memory; and
   a processor communicably coupled to the memory;
   wherein the processor is configured to:
   generate a noise map which includes one or more vectors comprising a direction and a value of noise for one or more electrical components on a substrate of a circuit;
   modify a design of the one or more electrical components in a pre-production design of the circuit based on the one or more vectors of the noise map and one or more noise rules of the circuit; and
   output an updated design of the circuit which includes the modified design of the one or more electrical components.

2. The system of claim 1, wherein the pre-production design of the circuit comprises a schematic layout of the circuit which includes geometric designs of the electrical components and placements of the electrical components on the substrate.

3. The system of claim 1, wherein the processor is configured to simulate noise maps of other electrical components of the one or more electrical components, and combine the simulated noise maps into the noise map.

4. The system of claim 1, wherein each vector comprises a total noise value and a total noise direction based on simulated noise maps.

5. The system of claim 1, wherein the noise map comprises a schematic representation of a shape and a location on the substrate for one or more of thermal noise, capacitive cross coupling noise, and power supply noise.

6. The system of claim 1, wherein the processor is configured to move a location of an electrical component a distance on the substrate based on a value and a direction of a vector associated with the electrical component in the noise map.

7. The system of claim 1, wherein the processor is configured to check whether the pre-production design of the circuit violates any of the noise rules of the circuit which include binary thresholds for one or more types of noise.

8. The system of claim 1, wherein the processor is configured to determine that the updated design of the circuit violates the noise rules of the circuit, and in response, modify a design of one or more other electrical components on the substrate.

9. A method, comprising:
   generating a noise map which includes one or more vectors comprising a direction and a value of noise for one or more electrical components on a substrate of a circuit;
   modifying a design of the one or more electrical components in a pre-production design of the circuit based on the one or more vectors of the noise map and one or more noise rules of the circuit; and
   outputting an updated design of the circuit which includes the modified design of the one or more electrical components.

10. The method of claim 9, wherein the pre-production design of the circuit comprises a schematic layout of the circuit including geometric designs of the electrical components and placements of the electrical components on the substrate.

11. The method of claim 9, wherein the generating the noise map comprises simulating noise maps of other electrical components of the one or more electrical components, and combining the simulated noise maps into the noise map.

12. The method of claim 9, wherein each vector comprises a total noise value and a total noise direction based on simulated noise maps.

13. The method of claim 9, wherein the noise map comprises a schematic representation of a shape and a location on the substrate for one or more of thermal noise, capacitive cross coupling noise, and power supply noise.

14. The method of claim 9, wherein the modifying comprises moving a location of an electrical component a distance on the substrate based on a value and a direction of a vector associated with the electrical component in the noise map.

15. The method of claim 9, further comprising checking whether the pre-production design of the circuit violates any of the noise rules of the circuit which include binary thresholds for one or more types of noise.

16. The method of claim 9, further comprising determining that the updated design of the circuit violates the noise rules of the circuit, and in response, modifying a design of one or more other electrical component on the substrate.

17. A non-transitory computer readable medium comprising instructions, that when read by a processor, cause the processor to perform a method comprising:
   generating a noise map which includes one or more vectors representing a direction and a value of noise for one or more electrical components on a substrate of a circuit;
   modifying a design of the one or more electrical components in a pre-production design of the circuit based on the one or more vectors of the noise map and one or more noise rules of the circuit; and
   outputting an updated design of the circuit which includes the modified design of the one or more electrical components.

18. The non-transitory computer readable medium of claim 17, wherein the pre-production design of the circuit comprises a schematic layout of the circuit including geometric designs of the electrical components and placements of the electrical components on the substrate.

19. The non-transitory computer readable medium of claim 17, wherein the generating the noise map comprises simulating noise maps of other electrical components of the one or more electrical components, and combining the simulated noise maps into the noise map.

20. The non-transitory computer readable medium of claim 17, wherein each vector comprises a total noise value and a total noise based on simulated noise maps.

* * * * *